(12) United States Patent
Huang

(10) Patent No.: US 12,196,264 B1
(45) Date of Patent: Jan. 14, 2025

(54) ROTATABLE MODULE

(71) Applicant: Xiaohe Huang, Shenzhen (CN)

(72) Inventor: Xiaohe Huang, Shenzhen (CN)

(*) Notice: Subject to any disclaimer, the term of this patent is extended or adjusted under 35 U.S.C. 154(b) by 0 days.

(21) Appl. No.: 18/674,121

(22) Filed: May 24, 2024

(30) Foreign Application Priority Data

May 14, 2024 (CN) .......................... 202421046190.6

(51) Int. Cl.
*F16C 33/50* (2006.01)
*F16C 19/30* (2006.01)

(52) U.S. Cl.
CPC .......... *F16C 33/504* (2013.01); *F16C 19/305* (2013.01)

(58) Field of Classification Search
CPC ........ F16C 19/30; F16C 19/305; F16C 19/32; F16C 19/507; F16C 33/4605; F16C 33/4641; F16C 33/4652; F16C 33/4682; F16C 33/504; F16C 33/61
See application file for complete search history.

(56) References Cited

U.S. PATENT DOCUMENTS 9,429,194 B2 * 8/2016 Reimchen ............. F16C 33/502
9,587,677 B2 * 3/2017 Roelofsen ............. A22C 17/00

FOREIGN PATENT DOCUMENTS

| CN | 101085503 A | 12/2007 | |
|---|---|---|---|
| CN | 108111735 A | 6/2018 | |
| CN | 217995899 U | 12/2022 | |
| WO | WO-2012157430 A1 * | 11/2012 | ............. F16C 19/30 |

* cited by examiner

*Primary Examiner* — James Pilkington
(74) *Attorney, Agent, or Firm* — Nitin Kaushik

(57) ABSTRACT

Disclosed is a rotatable module, which includes a lower ring and an upper ring, wherein a top surface of the lower ring forms a concentrically-arranged annular groove, and the upper ring is embedded in the annular groove to form a coaxial rotational fit with the lower ring; the lower ring includes a first half-ring and a second half-ring that are detachably spliced into a ring, and the upper ring includes a third half-ring and a fourth half-ring that are detachably spliced into a ring. The invention is easy to collect and store, takes up less space, and has better portability.

9 Claims, 8 Drawing Sheets

ROTATABLE MODULE

CROSS-REFERENCE TO RELATED APPLICATIONS

The application claims priority to Chinese patent application No. 2024210461906, filed on May 14, 2024, the entire contents of which are incorporated herein by reference.

TECHNICAL FIELD

The invention relates to a rotatable structure, in particular, to a rotatable module.

BACKGROUND

A rotatable structure may include a lower ring and an upper ring that is coaxially rotated and matched with the lower ring, and it can be used as a central rotatable mechanism in many equipment and devices.

The applicant found in practice that in the rotatable structure, the assembly relationship between the upper ring and the lower ring is usually prefabricated to be inseparable, and the upper and lower rings always maintain a complete ring shape, which is not convenient for collection and storage and will take up more space.

SUMMARY

The invention aims at providing a rotatable module that can make up for the above shortcomings of the prior art. The specific technical solution is as follows.

A rotatable module includes a lower ring and an upper ring, a top surface of the lower ring forming a concentrically-arranged annular groove and the upper ring being embedded in the annular groove to form a coaxial rotational fit with the lower ring, wherein the lower ring includes a first half-ring and a second half-ring that are detachably spliced into a ring, and the upper ring includes a third half-ring and a fourth half-ring that are detachably spliced into a ring.

As an improvement, both ends of the first half-ring are respectively provided with first plug connectors, both ends of the second half-ring are provided with first sockets corresponding to the first plug connectors, and the first plug connectors are detachably connected to the corresponding first sockets; both ends of the third half-ring are respectively provided with second plug connectors, both ends of the fourth half-ring are provided with second sockets corresponding to the second plug connectors, and the second plug connectors are detachably connected to the corresponding second sockets.

Further, a bottom surface of the second half-ring is provided with screws that penetrate upwardly into the first sockets and are connected to the first plug connectors in the first plug connectors.

Further, a plug end of the second plug connector has a pair of elastic arms that are opened into a U shape, sides of the elastic arms opposite to each other form a wedge-shaped bump at an end, and an inner wall of the second socket is provided with a groove corresponding to the bump; when the second plug connector is inserted into the second socket, a distance between the elastic arms is constrained by the second socket and becomes smaller, and the bump is embedded in the corresponding groove under the elastic stress of the elastic arm.

Further, the plug end of the second plug connector forms a wedge-shaped blocking block on a bottom surface, and the inner wall of the second socket is provided with a slot that matches the blocking block; when the second plug connector is inserted into the second socket, the blocking block is embedded in the slot under the elastic stress of the second socket.

Further, at least two positioning posts are respectively protruded from both ends of the third half-ring on end surfaces, and both ends of the fourth half-ring are respectively provided with positioning holes on end surfaces corresponding to the positioning posts; when the second plug connector is connected to the corresponding second socket, the positioning post is exactly coaxially inserted into the corresponding positioning hole.

As another improvement, bottom surfaces of the third half-ring and the fourth half-ring are respectively provided with a plurality of rotating components distributed at intervals in a circumferential direction of the upper ring, and the upper ring forms a rotational fit with the lower ring through the rotating component.

Further, the rotating component is a roller shaft arranged axially along a radial direction of the upper ring, and both ends of the rotating component are respectively provided with a central shaft rod along an axis; the bottom surfaces of the third half-ring and the fourth half-ring are provided with U-shaped grooves for the central shaft rod to correspond one to one, and the central shaft rod is embedded in the corresponding U-shaped groove.

Further, the first half-ring and the second half-ring are respectively provided with an annular guide rail located on a bottom surface of the annular groove, and a cylindrical surface of the roller shaft is supported on the annular guide rail.

Further, there are two annular guide rails that are arranged concentrically and spaced apart.

Compared with the prior art, the invention has the following beneficial effects: the invention adopts a detachable combined structure, wherein the lower ring and the upper ring may be split into half-rings respectively, which is convenient for collection and storage, takes up less space, and has better portability.

DETAILED DESCRIPTION OF THE EMBODIMENTS

Figure 1:
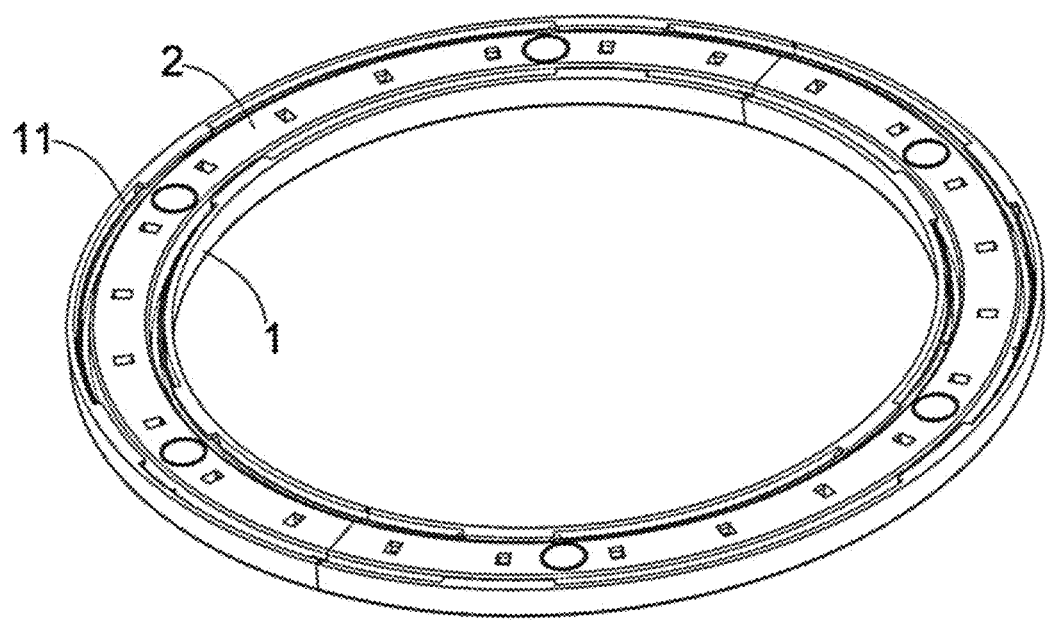
FIG. 1 is a structure diagram of the invention.
Figure 2:
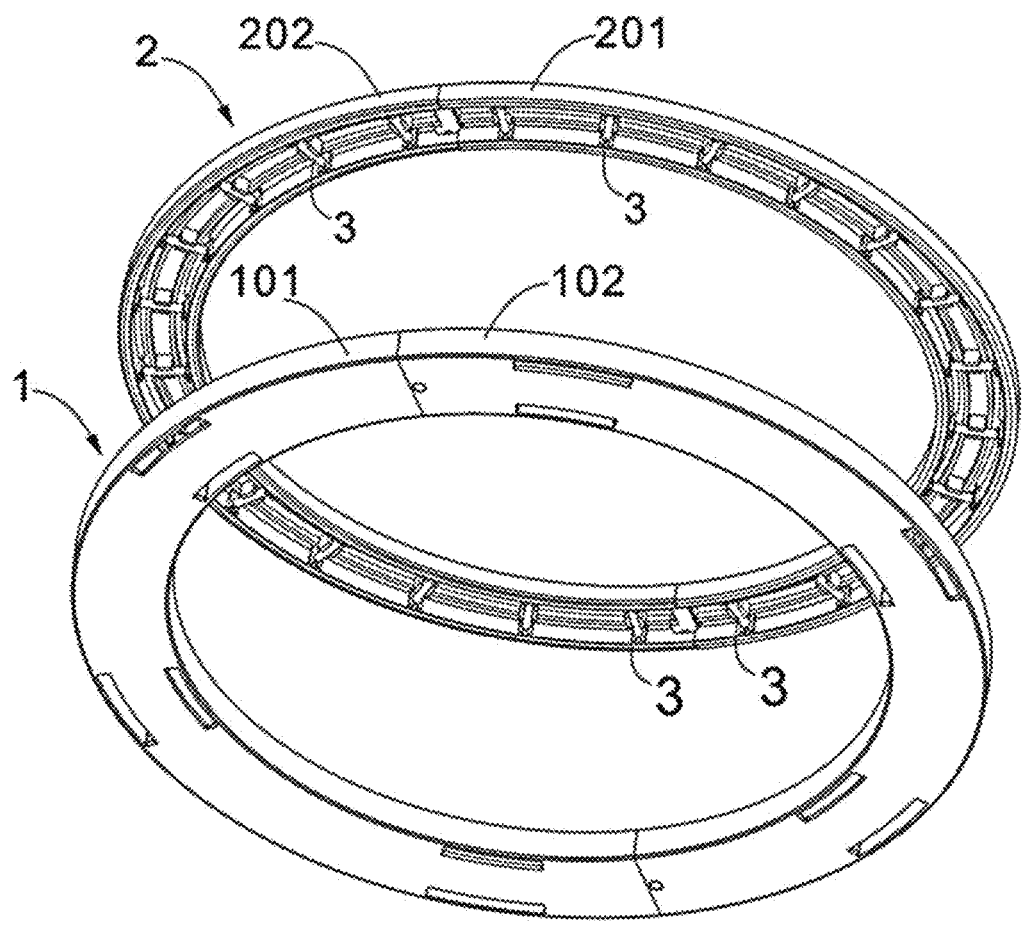
FIG. 2 is a structure diagram of the assembly of the invention.
Figure 3:
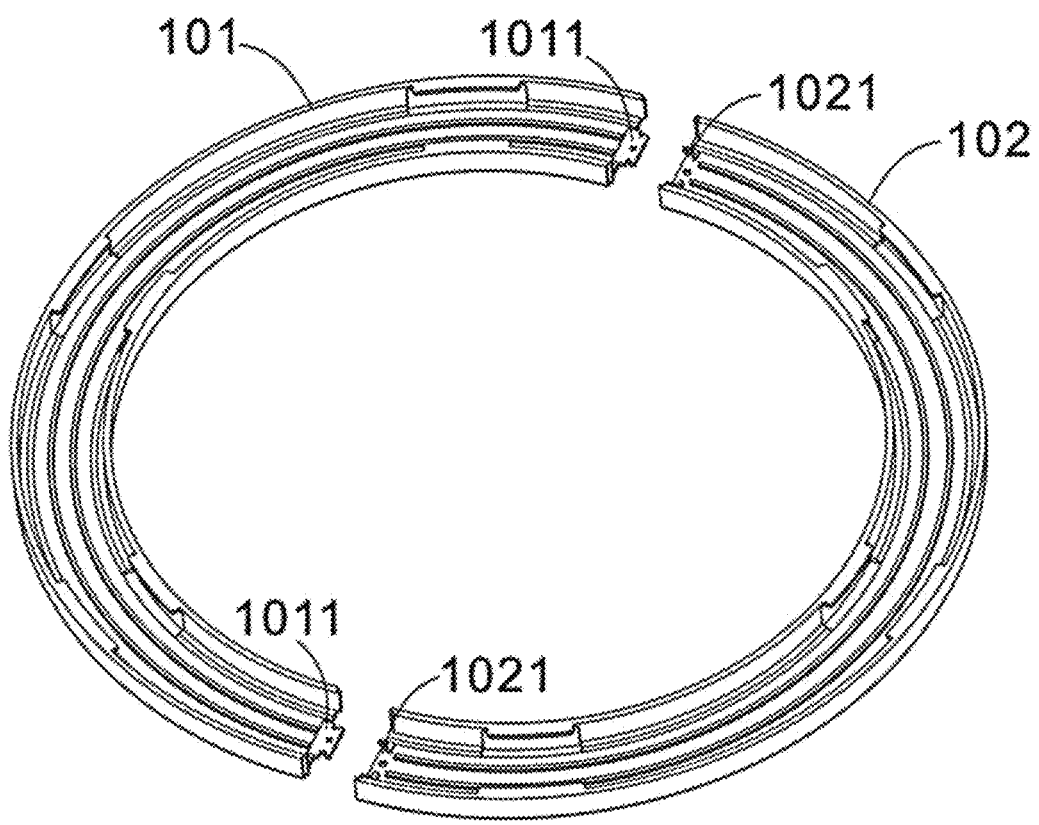
FIG. 3 is an exploded structure diagram of a lower ring of the invention.
Figure 4:
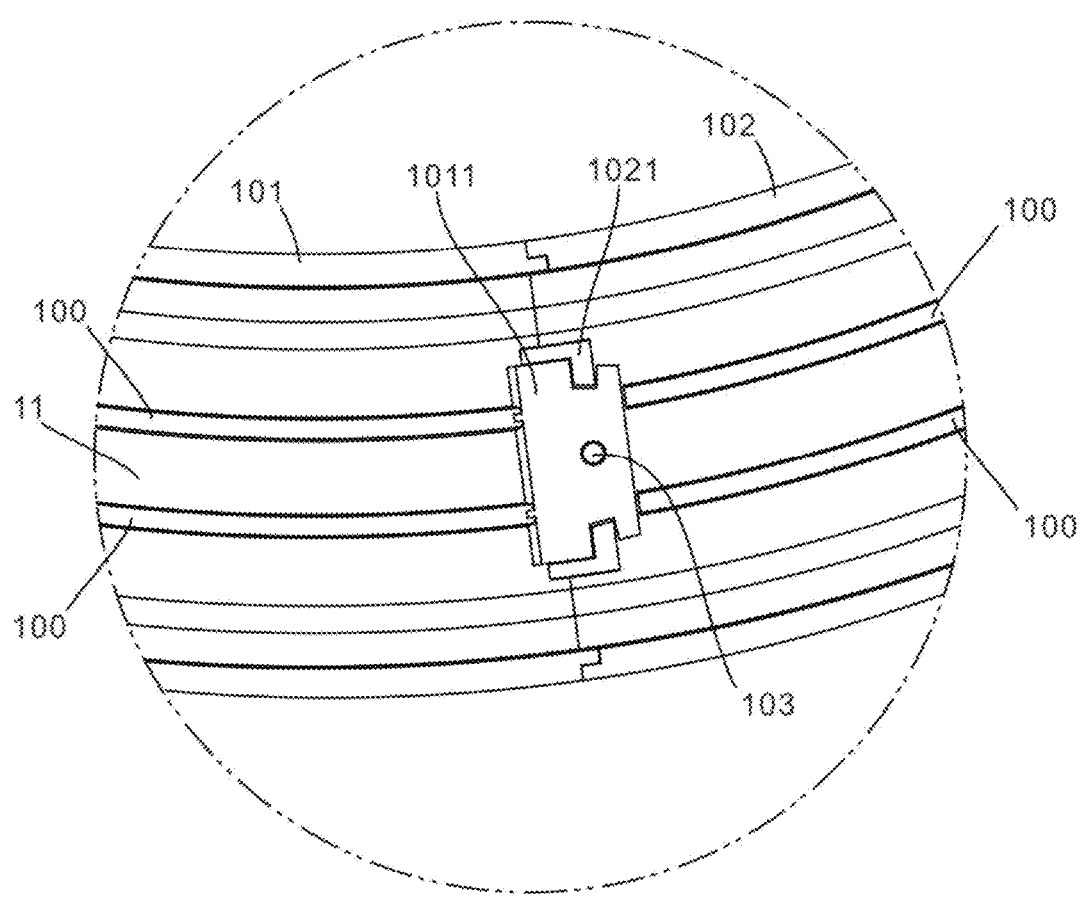
FIG. 4 is a structure diagram of the assembly of a first plug connector of the invention.
Figure 5:
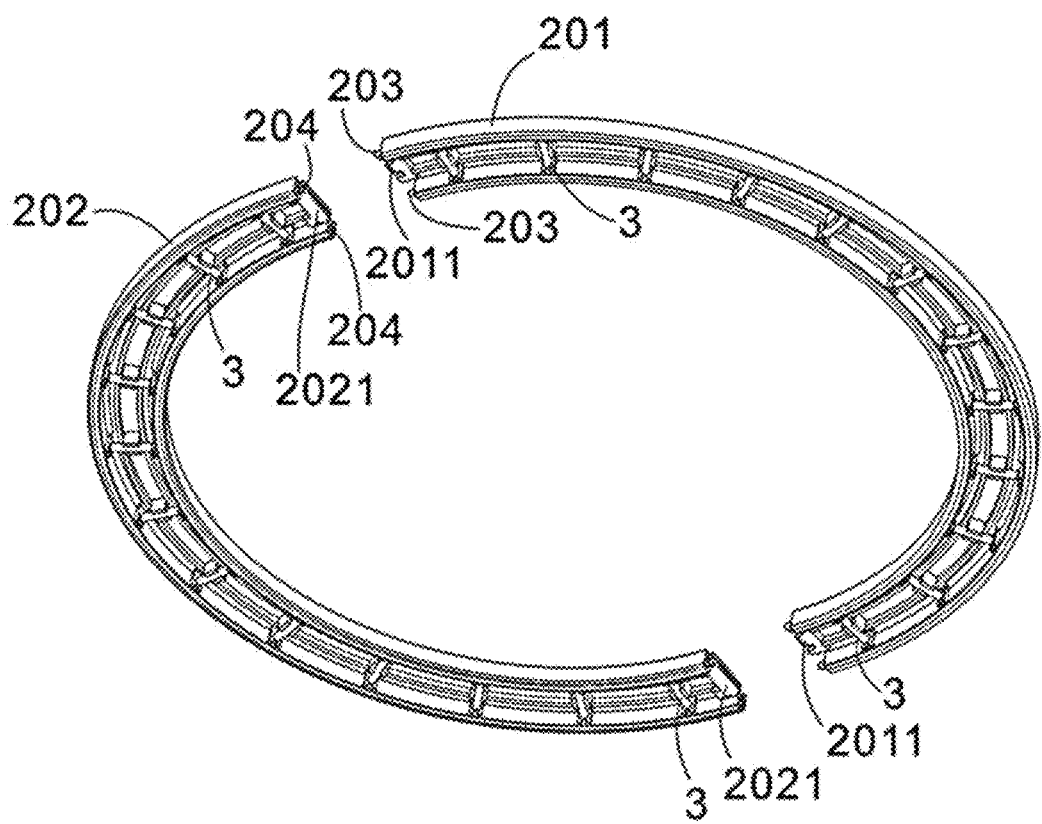
FIG. 5 is an exploded structure diagram of an upper ring of the invention.
Figure 6:
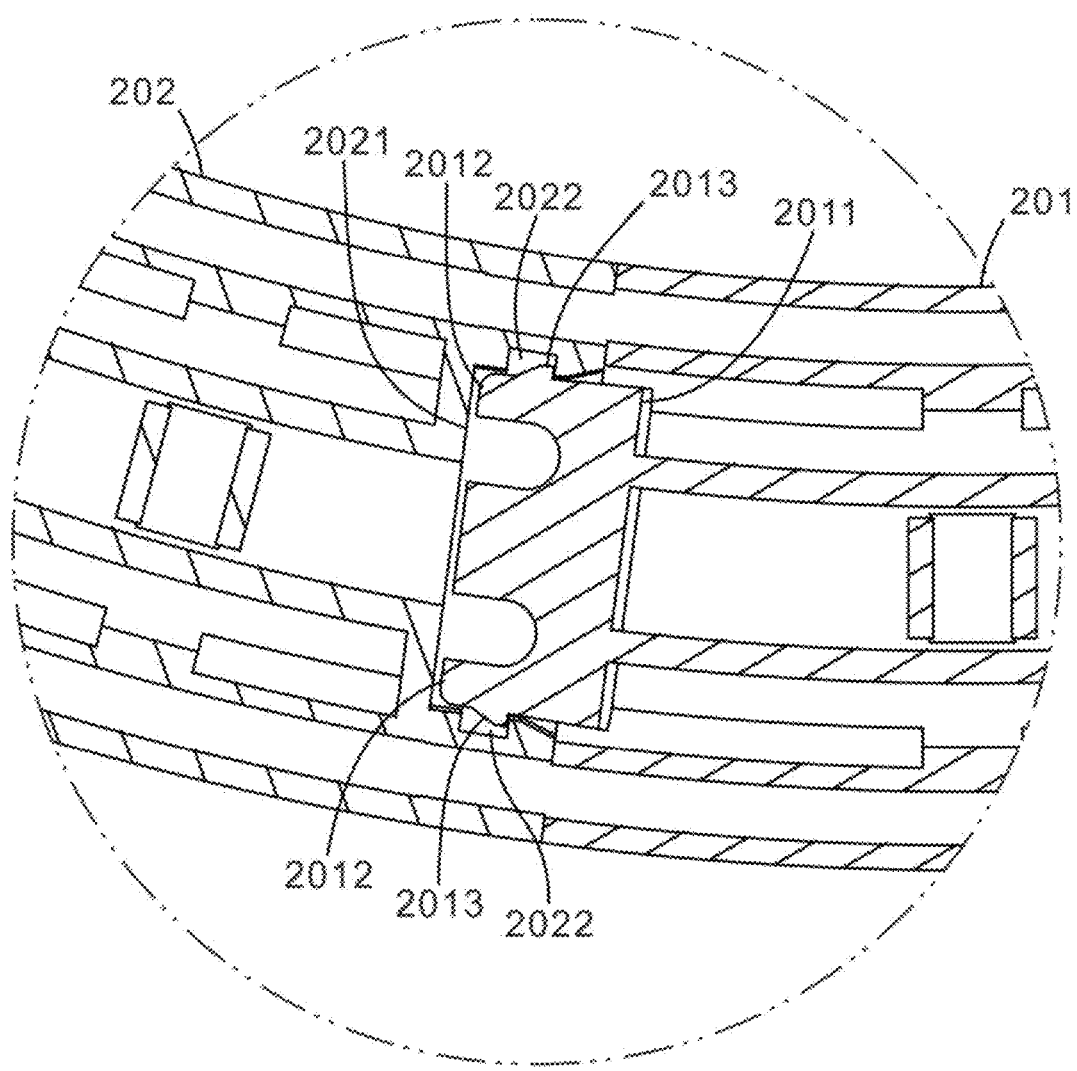
FIG. 6 is a first structure diagram of the assembly of a second plug connector of the invention.
Figure 7:
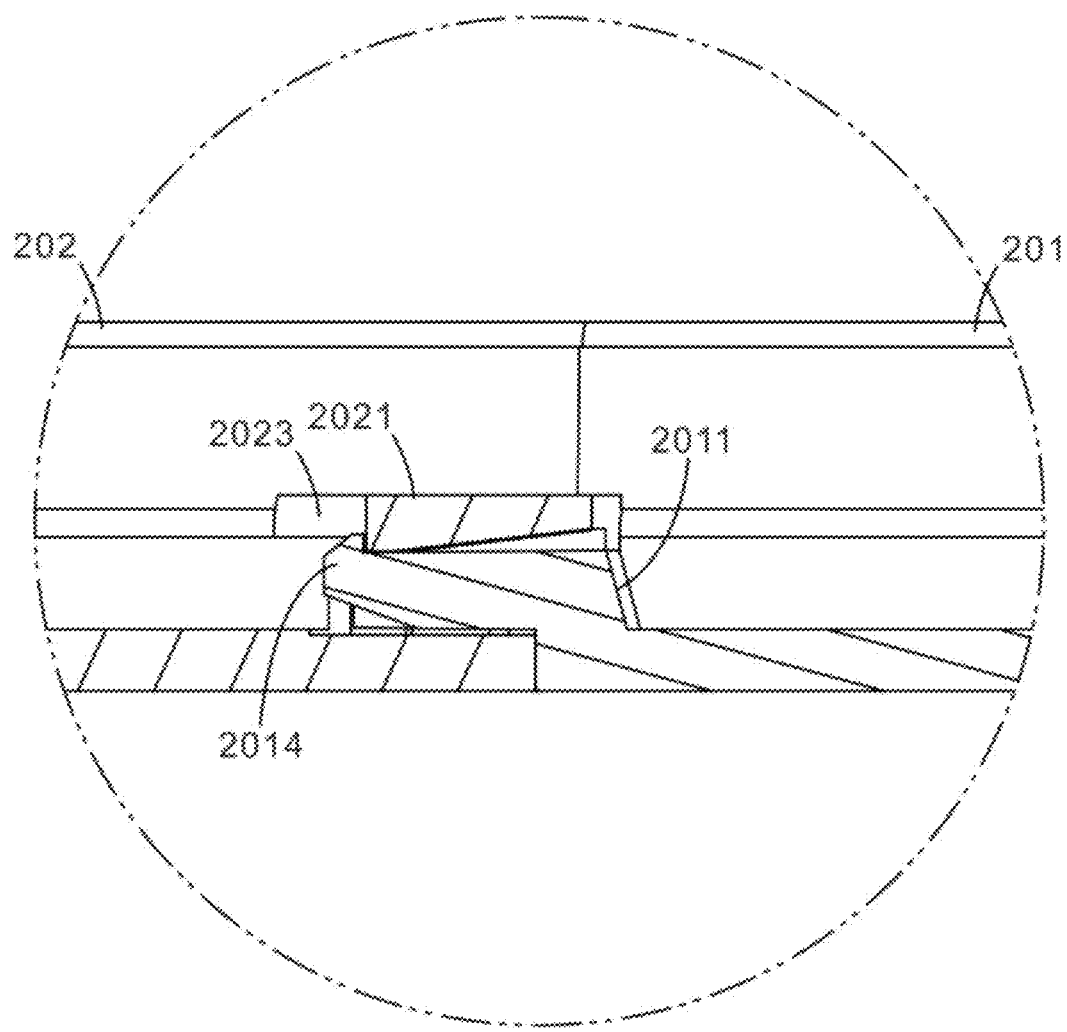
FIG. 7 is a second structure diagram of the assembly of the second plug connector of the invention.
Figure 8:
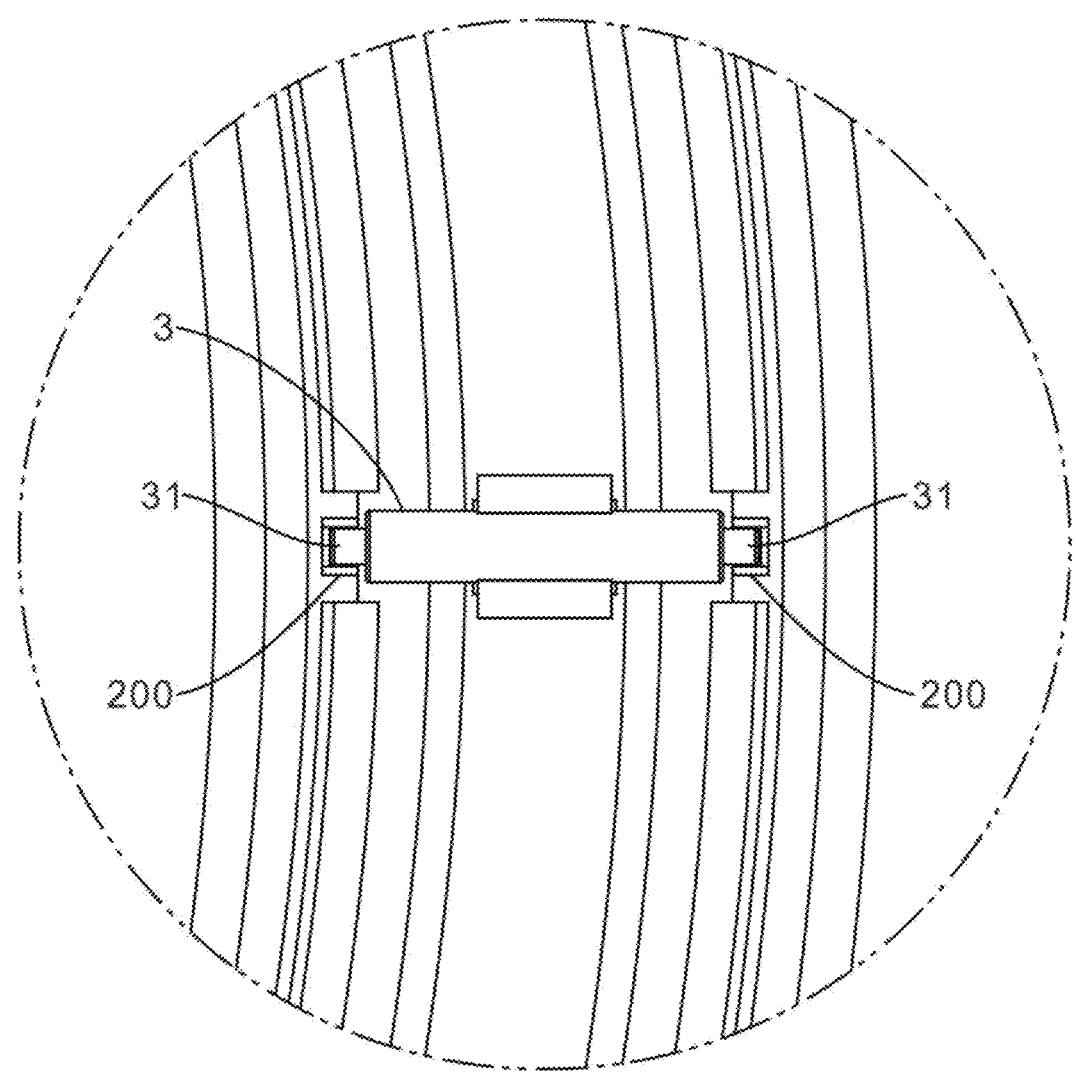
FIG. 8 is a structure diagram of the assembly of a rotating component of the invention.

As shown in FIGS. 1, 2, 3 and 5, the invention provides a rotatable module, which includes a lower ring 1 and an upper ring 2, a top surface of the lower ring 1 forming a concentrically-arranged annular groove 11 and the upper ring 2 being embedded in the annular groove 11 to form a coaxial rotational fit with the lower ring 1, wherein the lower ring 1 includes a first half-ring 101 and a second half-ring 102 that are detachably spliced into a ring, and the upper ring 2 includes a third half-ring 201 and a fourth half-ring 202 that are detachably spliced into a ring.

In the above technical solution, the lower ring 1 is placed flat on a table, the upper ring 2 is embedded in the annular groove 11 to form a coaxial rotational fit with the lower ring 1, and a top surface of the upper ring 2 is used to support rotating objects that are expected to be rotated. The rotating object and the upper ring 2 are arranged centrally, which forms a central rotating mechanism.

In the above technical solution, in view that the lower ring 1 and the upper ring 2 adopts a detachable combined structure and the lower ring 1 and the upper ring 2 may be split into half-rings respectively, the invention is convenient for collection and storage, takes up less space, and has better portability.

As an improvement, both ends of the first half-ring 101 are respectively provided with first plug connectors 1011, both ends of the second half-ring 102 are provided with first sockets 1021 corresponding to the first plug connectors 1011, and the first plug connectors 1011 are detachably connected to the corresponding first sockets 1021; both ends of the third half-ring 201 are respectively provided with second plug connectors 2011, both ends of the fourth half-ring 202 are provided with second sockets 2021 corresponding to the second plug connectors 2011, and the second plug connectors 2011 are detachably connected to the corresponding second sockets 2021.

Further, a bottom surface of the second half-ring 102 is provided with screws 103 that penetrate upwardly into the first sockets 1021 and are connected to the first plug connectors 1011 in the first plug connectors 1011. Obviously, when the screws 103 are tightened, the first plug connectors 1011 will be locked in the first sockets 1021, so that the first half-ring 101 and the second half-ring 102 remain connected with each other, and then the lower ring 1 will obtain a stable assembly posture. When the screws 103 are removed, the locking of the first plug connectors 1011 in the first sockets 1021 is released.

Further, a plug end of the second plug connector 2011 is provided with a pair of elastic arms 2012 that are opened into a U shape, sides of the elastic arms 2012 opposite to each other form a wedge-shaped bump 2013 at an end, and an inner wall of the second socket 2021 is provided with a groove 2022 corresponding to the bump 2013; when the second plug connector 2011 is inserted into the second socket 2021, a distance between the elastic arms 2012 is constrained by the second socket 2021 and becomes smaller, and the bump 2013 is embedded in the corresponding groove 2022 under the elastic stress of the elastic arm 2012. Generally, the elastic stress of the elastic arm 2012 may be generated by the characteristics of the injection molding material. When the second plug connectors 2011 are pulled out from the second sockets 2021, the elastic stress of the elastic arm 2012 is required to be overcome, which obviously allows the lower ring 1 to obtain a relatively stable assembly posture. At the same time, since the bump 2013 is fitted in the groove 2022 in a wedge-shaped structure, the second plug connectors 2011 are not locked in the second sockets 2021, but may overcome the elastic stress of the elastic arm 2012 to achieve operations of insertion, connection and separation.

Further, the plug end of the second plug connector 2011 forms a wedge-shaped blocking block 2014 on a bottom surface, and the inner wall of the second socket 2021 is provided with a slot 2023 that matches the blocking block 2014; when the second plug connector 2011 is inserted into the second socket 2021, the blocking block 2014 is embedded in the slot 2023 under the elastic stress of the second socket 2021. Generally, the elastic stress of the second socket 2021 may be generated by the characteristics of the injection molding material.

At least two positioning posts 203 are respectively protruded from both ends of the third half-ring 201 on end surfaces, and both ends of the fourth half-ring 202 are respectively provided with positioning holes 204 on end surfaces corresponding to the positioning posts 203; when the second plug connector 2011 is connected to the corresponding second socket 2021, the positioning post 203 is exactly coaxially inserted into the corresponding positioning hole 204. In this way, the user will be facilitated to achieve positioning more easily when assembling the third half-ring 201 and the fourth half-ring 202

As another improvement, bottom surfaces of the third half-ring 201 and the fourth half-ring 202 are respectively provided with a plurality of rotating components 3 distributed at intervals in a circumferential direction of the upper ring 2, and the upper ring 2 forms a rotational fit with the lower ring 1 through the rotating component 3.

Further, the rotating component 3 is a roller shaft arranged axially along a radial direction of the upper ring 2, and both ends of the rotating component 3 are respectively provided with a central shaft rod 31 along an axis; the bottom surfaces of the third half-ring and 201 the fourth half-ring 202 are provided with U-shaped grooves 200 for the central shaft rod 31 to correspond one to one, and the central shaft rod 31 is embedded in the corresponding U-shaped groove 200. Since the rotating component 3 is the roller shaft arranged axially along the radial direction of the upper ring 2, better concentricity may be obtained when the upper ring 2 rotates relative to the lower ring 1.

Further, the first half-ring 101 and the second half-ring 102 are respectively provided with an annular guide rail 100 located on a bottom surface of the annular groove 11, and a cylindrical surface of the roller shaft is supported on the annular guide rail 100, so as to facilitate the reduction of friction and noise.

Further, there are two annular guide rails 100 that are arranged concentrically and spaced apart.

For those skilled in the art, the protection scope of the invention is not limited to the details of the above exemplary embodiments. Without departing from the spirit or basic characteristics of the invention, all changes and implementations within the equivalent meaning and protection scope made by those skilled in the art based on the essentials of the invention shall be included in the invention.

What is claimed is:

1. A rotatable module, comprising a lower ring and an upper ring, a top surface of the lower ring forming a concentrically-arranged annular groove and the upper ring being embedded in the annular groove to form a coaxial rotational fit with the lower ring, wherein the lower ring comprises a first half-ring and a second half-ring that are detachably spliced into a ring, and the upper ring comprises a third half-ring and a fourth half-ring that are detachably spliced into a ring, wherein both ends of the first half-ring are respectively provided with first plug connectors, both ends of the second half-ring are provided with first sockets corresponding to the first plug connectors, and the first plug connectors are detachably connected to the corresponding first sockets; both ends of the third half-ring are respectively provided with second plug connectors, both ends of the fourth half-ring are provided with second sockets corresponding to the second plug connectors, and the second plug connectors are detachably connected to the corresponding second sockets.

2. The rotatable module according to claim 1, wherein a bottom surface of the second half-ring is provided with screws that penetrate upwardly into the first sockets and are connected to the first plug connectors.

3. The rotatable module according to claim 1, wherein a plug end of the second plug connector is provided with a pair of elastic arms, sides of the elastic arms opposite to each other form a wedge-shaped bump, and an inner wall of the second socket is provided with a groove corresponding to the bump; when the second plug connector is inserted into the second socket, the bump is embedded in the corresponding groove.

4. The rotatable module according to claim 3, wherein the plug end of the second plug connector forms a wedge-shaped blocking block on a bottom surface, and the inner wall of the second socket is provided with a slot that matches the blocking block: when the second plug connector is inserted into the second socket, the blocking block is embedded in the slot.

5. The rotatable module according to claim 1, wherein at least two positioning posts are respectively protruded from both ends of the third half-ring on end surfaces, and both ends of the fourth half-ring are respectively provided with positioning holes on end surfaces corresponding to the positioning posts: when the second plug connector is connected to the corresponding second socket, the positioning post is exactly coaxially inserted into the corresponding positioning hole.

6. The rotatable module according to claim 1, wherein bottom surfaces of the third half-ring and the fourth half-ring are respectively provided with a plurality of rotating components distributed at intervals in a circumferential direction of the upper ring, and the upper ring forms the rotational fit in the annular groove through the rotating component.

7. The rotatable module according to claim 6, wherein the rotating component is a roller shaft arranged axially along a radial direction of the upper ring, and both ends of the rotating component are respectively provided with a central shaft rod along an axis; the bottom surfaces of the third half-ring and the fourth half-ring are provided with U-shaped grooves for the central shaft rod to correspond one to one, and the central shaft rod is embedded in the corresponding U-shaped groove.

8. The rotatable module according to claim 7, wherein the first half-ring and the second half-ring are respectively provided with an annular guide rail located on a bottom surface of the annular groove, and a cylindrical surface of the roller shaft is supported on the annular guide rail.

9. The rotatable module according to claim 8, wherein there are two annular guide rails that are arranged concentrically and spaced apart.

\* \* \* \* \*